United States Patent
Haga et al.

(10) Patent No.: US 9,327,978 B2
(45) Date of Patent: *May 3, 2016

(54) METHOD FOR PRODUCING NON-GRAPHITIZABLE CARBON MATERIAL, NON-GRAPHITIZABLE CARBON MATERIAL, NEGATIVE ELECTRODE MATERIAL FOR LITHIUM-ION SECONDARY BATTERY, AND LITHIUM-ION SECONDARY BATTERY

(71) Applicant: JFE CHEMICAL CORPORATION, Tokyo (JP)

(72) Inventors: Ryuta Haga, Chiba (JP); Makiko Ijiri, Chiba (JP); Tetsuo Shiode, Chiba (JP); Katsuhiro Nagayama, Chiba (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/374,998

(22) PCT Filed: Jan. 24, 2013

(86) PCT No.: PCT/JP2013/000357
§ 371 (c)(1),
(2) Date: Jul. 28, 2014

(87) PCT Pub. No.: WO2013/111595
PCT Pub. Date: Aug. 1, 2013

(65) Prior Publication Data
US 2015/0017088 A1    Jan. 15, 2015

(30) Foreign Application Priority Data

Jan. 27, 2012 (JP) ................. 2012-014951
Nov. 15, 2012 (JP) ................. 2012-251004

(51) Int. Cl.
*C01B 31/02* (2006.01)
*H01M 4/587* (2010.01)
*H01M 10/0525* (2010.01)
*H01M 4/133* (2010.01)

(52) U.S. Cl.
CPC ............... *C01B 31/02* (2013.01); *H01M 4/587* (2013.01); *H01M 10/0525* (2013.01); *C01P 2004/61* (2013.01); *C01P 2006/12* (2013.01); *C01P 2006/40* (2013.01); *H01M 4/133* (2013.01)

(58) Field of Classification Search
CPC ....................................................... C01B 31/02
See application file for complete search history.

(56) References Cited

U.S. PATENT DOCUMENTS

| | | | |
|---|---|---|---|
| 8,574,533 B2 * | 11/2013 | Sonobe et al. | ............ 423/445 R |
| 2003/0147800 A1 | 8/2003 | Kwon et al. | |
| 2007/0287068 A1 | 12/2007 | Shimizu et al. | |
| 2008/0038182 A1 | 2/2008 | Kwon et al. | |
| 2009/0162753 A1 | 6/2009 | Kwon et al. | |
| 2009/0297953 A1 | 12/2009 | Shimizu et al. | |

FOREIGN PATENT DOCUMENTS

| | | |
|---|---|---|
| JP | A-3-252053 | 11/1991 |
| JP | A-6-89721 | 3/1994 |
| JP | A-6-236755 | 8/1994 |
| JP | A-8-115723 | 5/1996 |
| JP | A-9-153359 | 6/1997 |
| JP | A-10-83814 | 3/1998 |
| JP | A-10-308220 | 11/1998 |
| JP | A-2004-519408 | 7/2004 |
| WO | WO 2005/098999 A1 | 10/2005 |
| WO | WO 2007/040007 A1 | 4/2007 |

OTHER PUBLICATIONS

Mar. 5, 2013 International Search Report issued in International Application No. PCT/JP2013/000357.

* cited by examiner

*Primary Examiner* — Stuart Hendrickson
(74) *Attorney, Agent, or Firm* — Oliff PLC

(57) ABSTRACT

Provided is a method for producing a non-graphitizable carbon material, the method including a step in which a raw material of the non-graphitizable carbon material is subjected to a cross-linking treatment to obtain a cross-linked product; a step in which the cross-linked product is subjected to an infusibility-imparting treatment to obtain an infusibility-imparted product; a step in which the infusibility-imparted product is subjected to a pulverizing treatment; and a step in which the infusibility-imparted product that has been subjected to the pulverizing treatment is fired at 900° C. to 1300° C. to obtain the non-graphitizable carbon material.

4 Claims, 1 Drawing Sheet

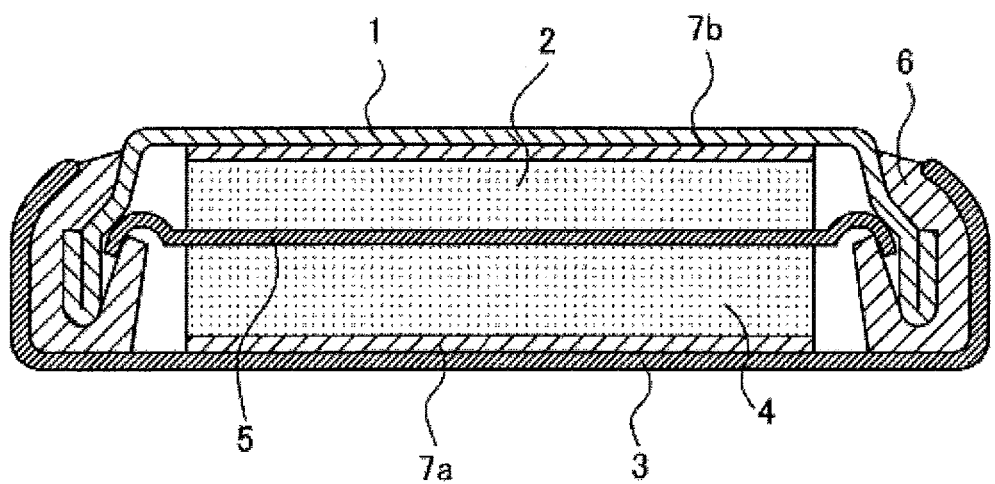

METHOD FOR PRODUCING NON-GRAPHITIZABLE CARBON MATERIAL, NON-GRAPHITIZABLE CARBON MATERIAL, NEGATIVE ELECTRODE MATERIAL FOR LITHIUM-ION SECONDARY BATTERY, AND LITHIUM-ION SECONDARY BATTERY

TECHNICAL FIELD

The present invention relates to a method for producing a non-graphitizable carbon material, the non-graphitizable carbon material, a negative electrode material for a lithium-ion secondary battery, and a lithium-ion secondary battery.

BACKGROUND ART

Recently, there has been growing international awareness of global environmental protection, and accordingly attention has focused on hybrid vehicles (HEVs and PHEVs) and electric vehicles (EVs) that realize reductions in the usage of fossil fuels and $CO_2$ emissions. Research and development on lithium-ion secondary batteries (LIB), which have a high energy density per unit volume and unit mass and are capable of being reduced in size, has been becoming more active in order to allow lithium-ion secondary batteries to be used as a power supply for driving a hybrid vehicle or an electric vehicle. At present, carbon materials are commonly used as negative electrode materials of lithium-ion secondary batteries. In addition to carbon, lithium salts of metals such as Si, Sn, Ti, and V, lithium salts of oxides of these metals, a carbon-metal hybrid material, and the like that have high energy density are still being studied.

Among carbon materials, graphite materials, generally having a high capacity, have been widely used for mobile electronic equipment and the like. Graphite materials, having a high energy density, are mainly used as negative electrode materials of vehicle-mounted batteries. On the other hand, attention is focused on non-graphitizable carbon materials, which have good input-output characteristics and cycle characteristics. In particular, it is necessary for batteries for hybrid vehicles to have good input-output characteristics used for starting a vehicle and obtaining regenerative energy and a long life property that allows a battery to be repeatedly charged and discharged for a long period of time. Thus, non-graphitizable carbon may be suitably used.

As an example of a non-graphitizable carbon material used as a negative electrode material of a lithium-ion secondary battery, a non-graphitizable carbon material produced from petroleum-derived pitch or coal-derived pitch has been reported (e.g., see Patent Literatures 1 to 4).

CITATION LIST

Patent Literature

PTL 1: Japanese Unexamined Patent Application Publication No. 3-252053

PTL 2: Japanese Unexamined Patent Application Publication No. 6-89721

PTL 3: Japanese Unexamined Patent Application Publication No. 8-115723

PTL 4: Japanese Unexamined Patent Application Publication No. 9-153359

SUMMARY OF INVENTION

Technical Problem

A process for producing a non-graphitizable carbon material using petroleum-derived pitch or coal-derived pitch as a raw material may be broadly divided into, for example, a step in which pitch is subjected to a cross-linking (oxidizing) treatment, a step of performing an infusibility-imparting treatment, and a step of firing. Additionally, a step in which calcination is performed at a temperature (e.g., 500° C. to 600° C.) lower than a firing temperature (e.g., 900° C. to 1300° C.) may be conducted between the step of performing an infusibility-imparting treatment and the step of firing.

The inventors of the present invention have conducted studies on the above-described method for producing a non-graphitizable carbon material. As a result, it became clear that, when a pulverizing treatment is performed after firing or calcination in order to achieve a predetermined particle diameter, controlling of the particle diameter of the carbon material to be produced may become difficult.

The present invention was made in light of the above-described points. An object of the present invention is to provide a method for producing a non-graphitizable carbon material in which the particle diameter of the non-graphitizable carbon material to be produced is readily controlled.

Solution to Problem

The inventors of the present invention have conducted extensive studies in order to achieve the above-described object and, as a result, found that performing a pulverizing treatment of an infusibility-imparted product facilitates controlling of particle diameter. Thus, the present invention was completed.

Accordingly, the present invention provides the following (1) to (6):

(1) a method for producing a non-graphitizable carbon material, the method including a step in which a raw material of the non-graphitizable carbon material is subjected to a cross-linking treatment to obtain a cross-linked product; a step in which the cross-linked product is subjected to an infusibility-imparting treatment to obtain an infusibility-imparted product; a step in which the infusibility-imparted product is subjected to a pulverizing treatment; and a step in which the infusibility-imparted product that has been subjected to the pulverizing treatment is fired at 900° C. to 1300° C. to obtain the non-graphitizable carbon material, (2) the method for producing a non-graphitizable carbon material described in (1), in which an average particle diameter of the infusibility-imparted product is reduced to 1 to 15 μm by the pulverizing treatment, (3) the method for producing a non-graphitizable carbon material described in (1) or (2), in which a specific surface area ratio (BET/CALC) of the non-graphitizable carbon material is 5.5 or less. The specific surface area ratio (BET/CALC) is a ratio of a specific surface area (BET) (units: $m^2/g$) calculated by a BET method using adsorption of nitrogen gas to a specific surface area (CALC) (units: $m^2/g$) calculated by the expression "$6/(D \times \rho)$", where D represents an average particle diameter (units: μm) and ρ represents an absolute specific gravity (units: $g/cm^3$), (4) a non-graphitizable carbon material having a specific surface area ratio (BET/CALC) of 5.5 or less. The specific surface area ratio (BET/CALC) is a ratio of a specific surface area (BET) (units: $m^2/g$) calculated by a BET method using adsorption of nitrogen gas to a specific surface area (CALC)

(units: $m^2/g$) calculated by the expression "$6/(D \times \rho)$", where D represents an average particle diameter (units: $\mu m$) and $\rho$ represents an absolute specific gravity (units: $g/cm^3$), (5) a negative electrode material for a lithium-ion secondary battery, the negative electrode material including the non-graphitizable carbon material described in (4), and (6) a lithium-ion secondary battery including the non-graphitizable carbon material described in (4) serving as a negative electrode material.

Advantageous Effects of Invention

According to the present invention, a method for producing a non-graphitizable carbon material in which the particle diameter of the non-graphitizable carbon material to be produced is readily controlled can be provided.

BRIEF DESCRIPTION OF DRAWING

FIG. 1 is a cross-sectional view of a coin-shaped secondary battery used for evaluation.

DESCRIPTION OF EMBODIMENTS

Method for Producing Non-Graphitizable Carbon Material

A method for producing a non-graphitizable carbon material according to the present invention (hereinafter, also simply referred to as "production method according to the present invention") includes a step in which a raw material of the non-graphitizable carbon material is subjected to a cross-linking treatment to obtain a cross-linked product, a step in which the cross-linked product is subjected to an infusibility-imparting treatment to obtain an infusibility-imparted product, a step in which the infusibility-imparted product is subjected to a pulverizing treatment, and a step in which the infusibility-imparted product that has been subjected to the pulverizing treatment is fired at 900° C. to 1300° C. to obtain the non-graphitizable carbon material.

The production method according to the present invention is described in detail below.

[Cross-Linking Treatment]

First, a raw material of the non-graphitizable carbon material (hereinafter, also simply referred to as "raw material") is subjected to a cross-linking treatment to obtain a cross-linked product.

The raw material used in the production method according to the present invention is not particularly limited, and raw materials that are publicly known in the art may be used. Examples thereof include pitches such as a coal-derived pitch and a petroleum-derived pitch; resins such as a phenol resin and a furan resin; and a mixture of pitch and a resin. In particular, pitches such as a coal-derived pitch and a petroleum-derived pitch are preferably used from the viewpoint of economy, etc.

The above-described raw material is subjected to a cross-linking treatment by, for example, the following method: a method using an air blowing reaction; a dry process using oxidizing gas (e.g., air, oxygen, ozone, or a mixture of these gases); and a wet process using an aqueous solution of nitric acid, sulfuric acid, hypochlorous acid, a mixed acid, or the like. In particular, a method using an air blowing reaction is preferably employed.

The air blowing reaction is a reaction in which the above-described raw material is heated and oxidizing gas (e.g., air, oxygen, ozone, or a mixture of these gases) is blown into the raw material in order to rise the softening point of the raw material. Through the air blowing reaction, for example, a cross-linked product (e.g., air-blown pitch) having a high softening point of 200° C. or more can be obtained.

According to Patent Literature 4, it is known that an air blowing reaction is conducted in the liquid state and oxygen atoms are hardly mixed into a carbon material during an air blowing reaction compared with a cross-linking treatment performed in the solid state.

In an air blowing reaction, a reaction mainly caused by oxidative dehydration occurs and polymerization occurs due to biphenyl-type cross-linking bonding. It is considered that, through the following infusibility-imparting and firing (described below), a non-graphitizable carbon material which has a non-oriented, three-dimensional structure dominantly constituted by the resulting cross-linked portions and in which a large number of cavities for occluding lithium remain is obtained.

The conditions of an air blowing reaction are not particularly limited. However, an excessively high temperature causes the mesophase to occur and a low temperature reduces the reaction velocity. Therefore, the reaction temperature is preferably 280° C. to 420° C. and is more preferably 320° C. to 380° C. The amount of oxidizing gas used for blowing is preferably, in the form of compressed air, 0.5 to 15 L/minute per 1000 g of pitch. This is because an air blowing reaction is hindered if the amount of oxidizing gas used for blowing is less than 0.5 L/minute and the reaction becomes too vigorous if the amount of oxidizing gas used for blowing exceeds 15 L/minute. The amount of oxidizing gas used for blowing is more preferably 1.0 to 10 L/minute. The reaction pressure is not particularly limited and may be any of a normal pressure, a reduced pressure, and an increased pressure.

The softening point of a cross-linked product, such as air-blown pitch, obtained by the above-described cross-linking treatment is preferably 200° C. to 400° C. because this facilitates an infusibility-imparting treatment. This is because, fusion is likely to occur if the softening point is less than 200° C. and the infusibility-imparting reactivity is degraded if the softening point exceeds 400° C. The softening point is more preferably 250° C. to 350° C.

Optionally, the cross-linked product may be roughly pulverized with an atomizer or the like prior to an infusibility-imparting treatment.

[Infusibility-Imparting Treatment]

Next, the cross-linked product is subjected to an infusibility-imparting treatment to obtain an infusibility-imparted product (e.g., infusibility-imparted pitch). An infusibility-imparting treatment is a kind of cross-linking treatment (oxidizing treatment) performed in the solid state. Through an infusibility-imparting treatment, oxygen is mixed into the structure of the cross-linked product and this increase the degree of cross linking, which imparts resistance to being fused at a high temperature to the cross-linked product.

A method for performing an infusibility-imparting treatment is not particularly limited and examples thereof include a dry process using oxidizing gas (e.g., air, oxygen, ozone, or a mixture of these gases); and a wet process using an aqueous solution of nitric acid, sulfuric acid, hypochlorous acid, a mixed acid, or the like. In particular, a dry process using oxidizing gas is preferable.

The treatment temperature of an infusibility-imparting treatment is needed to be set to be lower than the softening point of the cross-linked product. When an infusibility-imparting treatment is performed by a batch process, the rate of temperature rise is preferably set to 5° C./hour to 100° C./hour. This is because the productivity is low if the rate of temperature rise is less than 5° C./hour and fusion occurs if the rate of temperature rise exceeds 100° C./hour. The rate of temperature rise is more preferably set to 10° C./hour to 50° C./hour.

Other treatment conditions of an infusibility-imparting treatment are not particularly limited. However, for example, the amount of oxidizing gas used for blowing is preferably 1.0 to 20 L/minute per 1000 g in the form of compressed air. This is because the reaction is hindered if the amount of oxidizing gas used for blowing is less than 1.0 L/minute and the infusibility-imparting velocity is excessively increased if the amount of oxidizing gas used for blowing exceeds 20 L/hour. The amount of oxidizing gas used for blowing is more preferably 2.0 to 10 L/minute. The reaction pressure is not particularly limited and may be a normal pressure, a reduced pressure, or an increased pressure.

The oxygen content in the infusibility-imparted product obtained by an infusibility-imparting treatment is preferably 3% to 20% by mass in order to suppress fusion during firing. This is because fusion is likely to occur if the oxygen content is less than 3% by mass and the effect of imparting infusibility is not produced if the oxygen content exceeds 20% by mass. The oxygen content is more preferably 5% to 15% by mass.

[Pulverizing Treatment]

In the present invention, the infusibility-imparted product such as infusibility-imparted pitch is subjected to a pulverizing treatment to control the particle size. The pulverizing treatment facilitates controlling of the particle size of the non-graphitizable carbon material, which is the ultimate product, which facilitates achieving of the target average particle diameter.

The reason why the target average particle diameter is readily achieved is assumed to be as follows. An infusibility-imparted product that has not yet been subjected to firing is readily pulverized because the progress of carbonization is not advanced in such an infusibility-imparted product. In contrast, the progress of carbonization is advanced in an infusibility-imparted product that has been subjected to firing. Therefore, even when a pulverizing treatment is performed under the same conditions, pulverization cannot be performed to a sufficient degree and, as a result, it becomes difficult to control the particle diameter to be the target particle diameter.

In an application to a high-output-purpose thin-film electrode, it is necessary to set the particle size to be smaller than the thickness of a coating film. In order to increase the speed of intergranular diffusion, it is preferable that pulverization is performed so that the average particle diameter of the infusibility-imparted product that has been subjected to a pulverizing treatment is 1 to 15 μm. If the average particle diameter of the infusibility-imparted product is less than 1 μm, the specific surface area is excessively increased. If the average particle diameter of the infusibility-imparted product exceeds 15 μm, the input-output characteristics are degraded. It is more preferable that pulverization is performed so that the average particle diameter of the infusibility-imparted product is reduced to 1 to 7 μm.

The term "average particle diameter" used herein refers to a particle diameter ($D_{50}$) at which the cumulative frequency measured with a laser diffraction particle diameter analyzer reaches 50% by volume.

A pulverization machine used in a pulverizing treatment is not particularly limited, and methods that are publicly known in the art may be used. Examples of such pulverization machines include a jet mill, a pin mill, a ball mill, a hammer mill, a roller mill, and a vibrating mill.

When these pulverization machines are used, their pulverization conditions are set so that the average particle diameter of the infusibility-imparted product that has been subjected to a pulverizing treatment falls within the above-described range.

[Firing]

Subsequently, the infusibility-imparted product, such as infusibility-imparted pitch, which has been subjected to a pulverizing treatment is fired in a reduced pressure or in an inert gas atmosphere such as nitrogen to obtain a non-graphitizable carbon material. The temperature to be achieved in firing (firing temperature) is 900° C. to 1300° C. This is because the charge-discharge efficiency is reduced if the firing temperature is less than 900° C. and the discharging capacity is reduced if the firing temperature exceeds 1300° C. The firing temperature is more preferably 1000° C. to 1200° C. The rate of temperature rise is preferably set to 50° C./hour to 150° C./hour. This is because the productivity is degraded if the rate of temperature rise is less than 50° C./hour and fusion occurs if the rate of temperature rise is more than 150° C./hour. The rate of temperature rise is more preferably set to 80° C./hour to 120° C./hour.

[Non-Graphitizable Carbon Material]

A non-graphitizable carbon material produced by the above-described production method according to the present invention (hereinafter, also referred to as "non-graphitizable carbon material according to the present invention") can be suitably used as a negative electrode material for a lithium-ion secondary battery.

In an application to a high-output-purpose thin-film electrode, it is necessary to set the average particle diameter of the non-graphitizable carbon material according to the present invention to be smaller than the thickness of a coating film. In order to increase the speed of intergranular diffusion, the average particle diameter is preferably 1 to 15 μm and more preferably 1 to 7 μm.

The average particle diameter of the non-graphitizable carbon material according to the present invention is a particle diameter ($D_{50}$) at which the cumulative frequency measured with a laser diffraction particle diameter analyzer reaches 50% by volume.

The specific surface area (BET) of the non-graphitizable carbon material according to the present invention, which is measured by a BET method using adsorption of nitrogen gas, is preferably 10 $m^2/g$ or less and more preferably 1 to 6 $m^2/g$ in order to suppress the reactivity with an electrolyte solution. This is because, if the specific surface area (BET) is less than 1 $m^2/g$, ease of incorporation of lithium ions is degraded, which degrades the input-output characteristics and, if the specific surface area (BET) exceeds 6 $m^2/g$, the reactivity with an electrolyte solution is excessively increased, which reduces the charge-discharge efficiency.

The absolute specific gravity of the non-graphitizable carbon material according to the present invention is preferably 1.50 $g/cm^3$ or more, more preferably 1.54 $g/cm^3$ or more, and further preferably 1.60 $g/cm^3$ or more because, the higher the absolute specific gravity, the higher the electrode density.

In the present invention, the absolute specific gravity is determined by a liquid displacement method with a pycnometer using butanol in accordance with JIS R 7222.

In the non-graphitizable carbon material according to the present invention, the specific surface area ratio (BET/CALC) of the specific surface area (BET) measured by a BET method to a specific surface area (CALC) preferably falls within the below-described range.

The specific surface area (CALC) is a specific surface area calculated by the expression "$6/(D \times \rho)$", where "D" represents the average particle diameter (units: μm) and "ρ" represents the absolute specific gravity (units: g/cm³).

The technical meaning of the specific surface area ratio (BET/CALC) will now be described.

Since the above-described expression "6/(D×ρ)" is a formula for calculating the specific surface area of a sphere, the specific surface area (CALC) is calculated on the assumption that the shape of a non-graphitizable carbon material is spherical.

Thus, it is considered that, the closer the ratio (BET/CALC) of the specific surface area (BET), which is a measured value, to the specific surface area (CALC), which is calculated on the assumption that the shape of the non-graphitizable carbon material is spherical, is to 1, the closer the shape of the non-graphitizable carbon material is to spherical, that is, the smaller the number of surface irregularities or the like.

On the other hand, it is considered that, as the ratio (BET/CALC) becomes increasingly greater than 1, the more the shape of the non-graphitizable carbon material deviates from spherical, that is, the larger the number of surface irregularities. Specifically, it is considered that, for example, pores for incorporating nitrogen gas are present in the surface; or a fine powder produced due to the impact of forcible pulverization of a hard material is adhered to the surface.

If a lithium-ion secondary battery is produced using a non-graphitizable carbon material having a high ratio (BET/CALC), that is, a large number of surface irregularities, a decomposition reaction of an electrolyte solution is likely to occur (i.e., the area of the reaction interface is large) on the surface of the non-graphitizable carbon material. As a result, the battery characteristics such as initial efficiency may be degraded.

However, it is considered that, by using a non-graphitizable carbon material having a low ratio (BET/CALL), that is, a small number of surface irregularities, the area of the reaction interface with an electrolyte solution is reduced and the initial efficiency is enhanced.

In the above-described production method according to the present invention, a fine powder is less likely to be produced during pulverization because an infusibility-imparted product in which the progress of carbonization is not advanced is pulverized. This is one of the reasons why a non-graphitizable carbon material (non-graphitizable carbon material according to the present invention) having a small number of surface irregularities, that is, having a ratio (BET/CALC) that has been brought as close to 1 as possible, can be produced.

The ratio (BET/CALC) of the non-graphitizable carbon material according to the present invention is preferably 5.5 or less, more preferably less than 5, and further preferably 4 or less in order to achieve high initial efficiency.

The average interplanar spacing $d_{002}$ of the (002)-plane of the non-graphitizable carbon material according to the present invention measured by X-ray diffraction (hereinafter, also simply referred to as "average interplanar spacing $d_{002}$") is preferably 0.365 nm or more in order to realize a good discharging capacity and a long cycle-life.

In the present invention, the average interplanar spacing $d_{002}$ is calculated from the position of the diffraction peak measured on the (002)-plane of the non-graphitizable carbon material using CuKα radiation as X-ray and high purity silicon as a reference material. The calculation method adheres to a Gakushin method (measurement method established by the 17th Committee of Japan Society for the Promotion of Science), that is, specifically, a method described in "Tanso Seni" [Sugio Otani, pp. 733-742, (March 1986), Kindai Hensyu-sha].

Next, a lithium-ion secondary battery including the non-graphitizable carbon material according to the present invention serving as a negative electrode material (hereinafter, also referred to as "lithium-ion secondary battery according to the present invention") is described.

[Lithium-ion Secondary Battery]

Generally, a lithium-ion secondary battery includes a negative electrode, a positive electrode, and a nonaqueous electrolyte solution serving as major battery components. The positive and negative electrodes are each composed of a substance (as a lamellar compound), a compound, or a cluster that is capable of occluding lithium ions. Insertion and extraction of lithium ions during the charge-discharge process are performed between layers. A lithium-ion secondary battery has a mechanism in which lithium ions are doped into a negative electrode while the battery is charged and the lithium ions are de-doped from the negative electrode while the battery is discharged.

The lithium-ion secondary battery according to the present invention is not particularly limited except that it includes the non-graphitizable carbon material according to the present invention serving as a negative electrode material, and other battery components are similar to those of common lithium-ion secondary batteries.

[Negative Electrode]

A method for preparing a negative electrode using the non-graphitizable carbon material according to the present invention is not particularly limited and is similar to a general preparation method. When a negative electrode is prepared, a negative electrode mixture prepared by adding a binding agent to the non-graphitizable carbon material according to the present invention may be used. The binding agent preferably has chemical stability and electrochemical stability to an electrolyte. Generally, the content of the binding agent added is preferably about 1% to about 20% by mass of the total mass of the negative electrode mixture. Examples of the binding agent that can be used include polyvinylidene fluoride, carboxymethylcellulose (CMC), and styrene-butadiene rubber (SBR). Optionally, a carbon material other than the non-graphitizable carbon material according to the present invention or a graphite material may be added as an active material. Carbon black or carbon fiber may be added as a conductant agent.

The non-graphitizable carbon material according to the present invention is mixed with the binding agent to prepare a paste-like negative electrode mixture paint. Generally, the negative electrode mixture paint is applied to one or both surfaces of a current collector to form a negative electrode mixture layer. A common solvent may be used for preparing the paint. The shape of the current collector used for forming the negative electrode is not particularly limited, and examples thereof include foil-like shape; and net-like shapes such as the shape of mesh and the shape of expanded metal. Examples of the current collector include copper, stainless steel, and nickel.

[Positive Electrode]

It is preferable to select a material capable of doping/de-doping a sufficient amount of lithium ions as a material of a positive electrode (positive electrode active material). Examples of such a positive electrode active material include oxides of transition metals, chalcogenides of transition metals, vanadium oxide, lithium-containing compounds of these substances, Chevrel phase compounds represented by the general formula $M_X Mo_6 S_{8-Y}$ (where X represents a value of $0 \leq X \leq 4$, Y represents a value of $0 \leq Y \leq 1$, and M represents a metal such as a transition metal), lithium iron phosphate, active carbon, and activated carbon fiber. These substances may be used alone or in combination of two or more. For example, a carbonate such as lithium carbonate may be added in the positive electrode.

A lithium-containing transition metal oxide is a lithium-transition metal composite oxide or may be an oxide in which lithium and two or more transition metals are dissolved. Specifically, a lithium-containing transition metal oxide can be represented by $LiM(1)_{1-P}M(2)_PO_2$ (where P represents a value of $0 \leq P \leq 1$ and $M(1)$ and $M(2)$ each represent at least one transition metal element) or $LiM(1)_{2-Q}M(2)_QO_4$ (where Q represents a value of $0 \leq Q \leq 1$ and $M(1)$ and $M(2)$ each represent at least one transition metal element). Examples of the transition metal element represented by M include Co, Ni, Mn, Cr, Ti, V, Fe, Zn, Al, In, and Sn. Co, Fe, Mn, Ti, Cr, V, and Al are preferable.

The above-described lithium-containing transition metal oxide can be obtained from starting materials such as oxides or salts containing Li or a transition metal by mixing the starting materials in accordance with the composition and then firing the resulting mixture at 600° C. to 1000° C. in an oxygen atmosphere. The starting materials are not limited to oxides or salts, and the lithium-containing transition metal oxide can be synthesized from hydroxides.

In order to form a positive electrode using the above-described positive electrode material, for example, a paste-like positive electrode mixture paint including the positive electrode material, a binding agent, and a conductant agent is applied to one or both surfaces of a current collector to form a positive electrode mixture layer. The binding agent may be the same as the above-described examples of the binding agent that can be used for preparing the negative electrode. Examples of the conductant agent that can be used include fine-grain carbon materials, fiber-like carbon materials, graphite, carbon black, and VGCF (vapor-grown carbon fiber). The shape of the current collector is not particularly limited, and a current collector having a shape similar to that of the current collector used for the negative electrode may be used. Generally, aluminium, nickel, and stainless steel foil may be used as the material of the current collector.

When the above-described negative electrode and positive electrode are formed, various additives such as a conductant agent and a binding agent that are publicly known in the art may be used as needed.

[Electrolyte]

The electrolyte used is an ordinary nonaqueous electrolyte containing electrolyte salts that are lithium salts such as $LiPF_6$ and $LiBF_4$.

The nonaqueous electrolyte may be liquid, that is, a non-aqueous electrolyte solution or may be a polyelectrolyte, such as a solid electrolyte or a gel electrolyte.

When the nonaqueous electrolyte is liquid, that is, a non-aqueous electrolyte solution, an aprotonic organic solvent such as ethylene carbonate, propylene carbonate, or dimethyl carbonate may be used as a nonaqueous solvent.

When the nonaqueous electrolyte is a polyelectrolyte, the nonaqueous electrolyte includes a matrix polymer gelatinized using a plasticizer (nonaqueous electrolyte solution). Examples of the matrix polymer include ether-based polymers such as polyethylene oxide and its cross-linked product, polymethacrylates, polyacrylates, and fluorine-based polymers such as polyvinylidene fluoride and vinylidene fluoride-hexafluoropropylene copolymer. These polymers may be used alone or in mixture. In particular, fluorine-based polymers are preferably used from the viewpoints of redox stability and the like.

Examples of the electrolyte salt and the nonaqueous solvent constituting the plasticizer (nonaqueous electrolyte solution) contained in the polyelectrolyte are the same as those used for preparing the liquid electrolyte solution.

Generally, the lithium-ion secondary battery according to the present invention includes a separator that is a porous body composed of polypropylene or polyethylene; a multi-layered body constituted by the porous body; nonwoven fabric; or the like. Alternatively, a gel electrolyte can also be used as a separator. In this case, the lithium-ion secondary battery according to the present invention is formed by, for example, stacking a negative electrode including the non-graphitizable carbon material according to the present invention, a gel electrolyte, and a positive electrode on top of one another in this order and housing them in a battery-packaging member.

The lithium-ion secondary battery according to the present invention may have any structure, and there is no particular limitation on the shape and form of the lithium-ion secondary battery. For example, the shape of the lithium-ion secondary battery may be selected from a cylindrical shape, a rectangular shape, and a coin shape as needed.

EXAMPLE

The present invention is described specifically below with reference to examples. However, the present invention is not limited to these examples.

Example 1

In an autoclave equipped with an anchor-shaped stirrer, 1000 g of coal-derived low-QI pitch (QI: 0.1% to 0.5% by mass, softening point: 82.5° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 3 hours to perform an infusibility-imparting treatment. Thus, infusibility-imparted pitch was prepared.

The infusibility-imparted pitch was subjected to a pulverizing treatment using a jet mill (FS-4, produced by Seishin Enterprise Co., Ltd.) so that the average particle diameter of the pulverized product was reduced to 3 μm. In a lidded graphite container, 100 g of the infusibility-imparted pitch that had been subjected to the pulverizing treatment was charged. The temperature was increased to 1100° C. at a rate of temperature rise of 100° C./hour under a stream of nitrogen, and firing was performed at 1100° C. for 2 hours. Thus, a carbon powder was prepared.

Examples 2 to 4

In Examples 2 to 4, a carbon powder was prepared as in Example 1 except that a condition (pulverization time) of the pulverizing treatment was changed. Specifically, infusibility-imparted pitch was subjected to a pulverizing treatment using a jet mill (FS-4, produced by Seishin Enterprise Co., Ltd.) so that the average particle diameter of the pulverized product was reduced to 4.5 μm in Example 2, 7 μm in Example 3, and 11 μm in Example 4.

Examples 5 and 6

In an autoclave equipped with an anchor-shaped stirrer, 1000 g of petroleum-derived low-QI pitch (QI: 0.1% to 0.5% by mass, softening point: 100° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 2 hours to perform an infusibility-imparting treatment. Thus, infusibility-imparted pitch was prepared.

The infusibility-imparted pitch was subjected to a pulverizing treatment using a jet mill (FS-4, produced by Seishin Enterprise Co., Ltd.). In Example 5, the pulverization conditions were the same as in Example 2 In Example 6, the pulverization conditions were the same as in Example 4.

In a lidded graphite container, 100 g of the infusibility-imparted pitch that had been subjected to the pulverizing treatment was charged. The temperature was increased to 1100° C. at a rate of temperature rise of 100° C./hour under a stream of nitrogen, and firing was performed at 1100° C. for 2 hours. Thus, a carbon powder was prepared.

Comparative Example 1

In an autoclave equipped with an anchor-shaped stirrer, 1000 g of coal-derived low-QI pitch (QI: 0.1% to 0.5% by mass, softening point: 82.5° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 3 hours to perform an infusibility-imparting treatment. Thus, infusibility-imparted pitch was prepared.

In a lidded graphite container, 100 g of the infusibility-imparted pitch was charged. The temperature was increased to 1100° C. at a rate of temperature rise of 100° C./hour under a stream of nitrogen, and firing was performed at 1100° C. for 2 hours. Subsequently, a pulverization treatment was performed under the same conditions as in Example 1. Thus, a carbon powder was prepared.

Comparative Example 2

In an autoclave equipped with an anchor-shaped stirrer, 1000 g of coal-derived low-QI pitch (QI: 0.1% to 0.5% by mass, softening point: 82.5° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 3 hours to perform an infusibility-imparting treatment. Thus, infusibility-imparted pitch was prepared.

In a lidded graphite container, 100 g of the infusibility-imparted pitch was charged. Calcination was performed at 600° C. for 1 hour in a firing furnace. The resulting product (hereinafter, referred to as "calcined pitch") was subjected to a pulverization treatment under the same conditions as in Example 2. In a lidded graphite container, 100 g of the calcined pitch that had been subjected to the pulverizing treatment was charged. The temperature was increased to 1100° C. at a rate of temperature rise of 100° C./hour under a stream of nitrogen, and firing was performed at 1100° C. for 2 hours. Thus, a carbon powder was prepared.

Comparative Example 3

In an autoclave equipped with an anchor-shaped stirrer, 1000 g of petroleum-derived low-QI pitch (QI: 0.1% to 0.5% by mass, softening point: 100° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 2 hours to perform an infusibility-imparting treatment. Thus, infusibility-imparted pitch was prepared.

In a lidded graphite container, 100 g of the infusibility-imparted pitch was charged. The temperature was increased to 1100° C. at a rate of temperature rise of 100° C./hour under a stream of nitrogen, and firing was performed at 1100° C. for 2 hours.

Then, a pulverization treatment was performed under the same pulverization condition as in Example 3. Thus, a carbon powder was prepared.

Comparative Example 4

In an autoclave equipped with an anchor-shaped stirrer, 1000 g of petroleum-derived low-QI pitch (QI: 0.1% to 0.5% by mass, softening point: 200° C.) was charged. Heating was performed to 320° C. under a stream of nitrogen. Subsequently, while compressed air was introduced into the autoclave at 2 L/minute and blown into the pitch, heating was performed at 320° C. for 2 hours to perform a cross-linking treatment by an air blowing reaction. Then, cooling was performed to room temperature and the content (air-blown pitch) was taken from the autoclave.

The air-blown pitch was roughly pulverized with an atomizer and charged in a rotary furnace. While compressed air was introduced into the furnace at 2 L/minute, the temperature was increased at 20° C./hour and kept at 250° C. for 2 hours to perform an infusibility-imparting treatment. Thus, infusibility-imparted pitch was prepared.

In a lidded graphite container, 100 g of the infusibility-imparted pitch was charged. Calcination was performed at 600° C. for 1 hour in a firing furnace. Thus, a calcined product (hereinafter, referred to as "calcined pitch") was prepared.

Next, the calcined pitch was subjected to a pulverization treatment under the same conditions as in Example 2.

In a lidded graphite container, 100 g of the calcined pitch that had been subjected to the pulverizing treatment was charged. The temperature was increased to 1100° C. at a rate of temperature rise of 100° C./hour under a stream of nitrogen, and firing was performed at 1100° C. for 2 hours. Thus, a carbon powder was prepared.

Evaluations

Evaluation of Carbon Powder

For each of the carbon powders prepared in Examples 1 to 6 and Comparative Examples 1 to 4, the average particle diameter (units: μm), absolute specific gravity (units: $g/cm^3$), specific surface area (CALL) (units: $m^2/g$), specific surface area (BET) (units: $m^2/g$), and specific surface area ratio (BET/CALC) were determined by the above-described method. Table 1 shows the results.

Coin-shaped secondary batteries used for evaluation (see FIG. 1) were prepared using the respective carbon powders prepared in Examples 1 to 6 and Comparative Examples 1 to 4 as negative electrode materials. Then, various evaluations were conducted.

Preparation of Negative Electrode Mixture Paste

A negative electrode mixture paste was prepared using each of the prepared carbon powders as a negative electrode material. Specifically, the negative electrode mixture paste was prepared by charging the carbon powder (95 parts by mass) and a 12% solution of polyvinylidene difluoride in N-methylpyrrolidinone (5 parts by mass in terms of solid content) in a planetary mixer, stirring the resulting mixture at 100 rpm for 15 minutes, adding N-methylpyrrolidinone to the mixture so that the solid content proportion of 60% was achieved, and stirring the resulting mixture for 15 minutes.

Preparation of Working Electrode (Negative Electrode

The prepared negative electrode mixture paste was applied onto copper foil with a uniform thickness. The resulting copper foil was placed in a fan drying machine, and the temperature was set to 100° C. to volatilize the solvent. Thus, a negative electrode mixture layer was formed. The negative electrode mixture layer was pressed by roller pressing and then stamped into a circular shape having a diameter of 15.5 mm. Thus, a working electrode (negative electrode) including a negative electrode mixture layer adhered to a current collector composed of copper foil was prepared. Prior to the evaluations, drying was performed in vacuum at 100° C. for 8 hours or more.

Preparation of Electrolyte Solution

Ethylene carbonate (33% by volume) was mixed with methylethyl carbonate (67% by volume) to prepare a solvent mixture, and $LiPF_6$ was dissolved in the solvent mixture at a concentration of 1 $mol/dm^3$ to prepare a nonaqueous electrolyte solution.

Preparation of Evaluation Battery

A coin-shaped secondary battery used for evaluation (may be simply referred to as "evaluation battery") shown in FIG. 1 was prepared using the prepared working electrode (negative electrode). FIG. 1 is a cross-sectional view of the coin-shaped secondary battery used for evaluation.

Lithium metal foil was pressed against a nickel net, and the foil and the net were stamped into a circular shape having a diameter of 15.5 mm. Thus, a disc-shaped counter electrode 4 composed of lithium foil adhered to a current collector 7a composed of a nickel net was prepared.

Then, a separator 5 that had been impregnated with an electrolyte solution was interposed between a working electrode (negative electrode) 2 adhered to a current collector 7b and the counter electrode 4 adhered to the current collector 7a. Subsequently, the working electrode 2 was housed in a packaging cap 1, and the counter electrode 4 was housed in a packaging can 3. The packaging cap 1 and the packaging can 3 were brought together, and the peripheries of the packaging cap 1 and the packaging can 3 were caulked together with an insulating gasket 6 interposed between the packaging cap 1 and the packaging can 3 to achieve hermetic sealing. Thus, an evaluation battery was prepared.

In the prepared evaluation battery, a sealed structure is formed since the peripheries of the packaging cap 1 and the packaging can 3 are caulked together with the insulating gasket 6 interposed therebetween. Inside the sealed structure, as shown in FIG. 1, the current collector 7a, the counter electrode 4, the separator 5, the working electrode (negative electrode) 2, and the current collector 7b are stacked on top of one another sequentially in the direction from the inner surface of the packaging can 3 to the inner surface of the packaging cap 1.

Charge-Discharge Test

The prepared evaluation battery was subjected to the following charge-discharge test at 25° C. In the following test, a process of doping lithium ions in a carbon powder was referred to as "charging", and a process of de-doping the lithium ions from the carbon powder was referred to as "discharging".

Constant-current charging was performed until the circuit voltage reached 0 mV at a current value of 0.9 mA, and, upon the circuit voltage reaching 0 mV, the constant-current charging was switched to constant-voltage charging and charging was continued until the current value reached 20 μA. A first charging capacity (units: mAh/g) was determined from the amount of current carried during this period. After a break of 120 minutes, constant-current discharging was performed at a current value of 0.9 mA until the circuit voltage reached 1.5 V. A first discharging capacity (units: mAh/g) was determined from the amount of current carried during this period.

Initial Efficiency

An initial efficiency (units: %) was calculated from the results of the above-described charge-discharge test using the following expression.

Initial Efficiency=(First Discharging Capacity/First Charging Capacity)×100

TABLE 1

|  |  | Average particle diameter (target value) [μm] | Average particle diameter (measured value) [μm] | Absolute specific gravity [g/cm³] | Specific surface area (CALC) [m²/g] | Specific surface area (BET) [m²/g] | Specific surface area ratio (BET/CALC) | Initial efficiency [%] |
|---|---|---|---|---|---|---|---|---|
| Example | 1 | 3 | 3.2 | 1.61 | 1.2 | 4.5 | 3.9 | 80 |
|  | 2 | 4.5 | 4.5 | 1.61 | 0.8 | 3.3 | 4.0 | 80 |
|  | 3 | 7 | 7.0 | 1.61 | 0.5 | 2.0 | 3.8 | 80 |
|  | 4 | 11 | 10.5 | 1.62 | 0.4 | 1.2 | 3.4 | 81 |
|  | 5 | 4.5 | 5.0 | 1.54 | 0.8 | 3.4 | 4.3 | 79 |
|  | 6 | 11 | 10.0 | 1.54 | 0.4 | 1.5 | 3.9 | 80 |
| Comparative example | 1 | 3 | 5.9 | 1.61 | 0.6 | 6.5 | 10.4 | 73 |
|  | 2 | 4.5 | 6.6 | 1.60 | 0.6 | 3.2 | 5.6 | 76 |
|  | 3 | 7 | 12.0 | 1.54 | 0.3 | 2.5 | 7.8 | 73 |
|  | 4 | 4.5 | 5.9 | 1.54 | 0.7 | 3.9 | 5.9 | 75 |

As is clearly shown by the results shown in Table 1, it was found that, in Examples 1 to 6, carbon powders having average particle diameters that were substantially equal to the respective target average particle diameters were produced and, in Comparative Examples 1 to 4, on the other hand, ease of pulverization was significantly degraded and it was difficult to produce a carbon powder having an average particle diameter that is substantially equal to the target average particle diameter.

In addition, it was found that the particle diameter can be readily controlled by changing the pulverization conditions as in Examples 2 to 4.

It was also found that the carbon powders prepared in Examples 1 to 6 had smaller specific surface area ratios (BET/CALC) than those prepared in Comparative Examples 1 to 4 and had high initial efficiencies.

REFERENCE SIGNS LIST 1 packaging cap
2 working electrode
3 packaging can
4 counter electrode
5 separator
6 insulating gasket
7a current collector
7b current collector

The invention claimed is:

1. A method for producing a non-graphitizable carbon material, the method comprising:
    subjecting a raw material of the non-graphitizable carbon material to a cross-linking treatment to obtain a cross-linked product;
    subjecting the cross-linked product to an infusibility-imparting treatment to obtain an infusibility-imparted product;
    subjecting the infusibility-imparted product to a pulverizing treatment; and
    firing the infusibility-imparted product that has been subjected to the pulverizing treatment at a temperature in the range of 900° C. to 1300° C. to obtain the non-graphitizable carbon material.

2. The method for producing a non-graphitizable carbon material according to claim 1, wherein an average particle diameter of the infusibility-imparted product after the pulverizing treatment is in the range of 1 to 15 μm.

3. The method for producing a non-graphitizable carbon material according to claim 1, wherein a specific surface area ratio (BET/CALC) of the non-graphitizable carbon material is in the range of 5.5 or less, the specific surface area ratio (BET/CALC) being a ratio of a specific surface area (BET) (units: m²/g) calculated by a BET method using adsorption of nitrogen gas to a specific surface area (CALC) (units: m²/g) calculated by the expression:

$$6/(D \times \rho),$$

where D represents an average particle diameter and ρ represents an absolute specific gravity (units: g/cm³).

4. The method for producing a non-graphitizable carbon material according to claim 2, wherein a specific surface area ratio (BET/CALC) in the range of the non-graphitizable carbon material is in the range of 5.5 or less, the specific surface area ratio (BET/CALC) being a ratio of a specific surface area (BET) (units: m²/g) calculated by a BET method using adsorption of nitrogen gas to a specific surface area (CALC) (units: m²/g) calculated by the expression:

$$6/(D \times \rho),$$

where D represents an average particle diameter (units: μm) and ρ represents an absolute specific gravity (units: g/cm³).

* * * * *